US011055935B2

(12) United States Patent
Jordan et al.

(10) Patent No.: US 11,055,935 B2
(45) Date of Patent: *Jul. 6, 2021

(54) REAL-TIME DATA ACQUISITION AND RECORDING SYSTEM VIEWER

(71) Applicant: Wi-Tronix, LLC, Bolingbrook, IL (US)

(72) Inventors: Lawrence B. Jordan, Bolingbrook, IL (US); Savankumar V. Patel, Bolingbrook, IL (US); Bryan D. Weaver, Bolingbrook, IL (US)

(73) Assignee: Wi-Tronix, LLC, Bolingbrook, IL (US)

( * ) Notice: Subject to any disclaimer, the term of this patent is extended or adjusted under 35 U.S.C. 154(b) by 240 days.

This patent is subject to a terminal disclaimer.

(21) Appl. No.: 16/385,745

(22) Filed: Apr. 16, 2019

(65) Prior Publication Data
US 2019/0244447 A1   Aug. 8, 2019

Related U.S. Application Data

(60) Division of application No. 15/595,689, filed on May 15, 2017, now Pat. No. 10,410,441, and a
(Continued)

(51) Int. Cl.
*G07C 5/08*      (2006.01)
*H04N 5/232*   (2006.01)
(Continued)

(52) U.S. Cl.
CPC ......... *G07C 5/0858* (2013.01); *G07C 5/0866* (2013.01); *H04N 5/23238* (2013.01);
(Continued)

(58) Field of Classification Search
CPC .... G07C 5/0858; G07C 5/0866; G07C 5/008; H04N 5/23238; H04N 5/247; H04N 5/77; H04N 5/9201; H04N 9/8042
See application file for complete search history.

(56) References Cited

U.S. PATENT DOCUMENTS

| 5,065,321 A | 11/1991 | Bezos et al. |
| 5,377,497 A | 1/1995 | Powell |

(Continued)

FOREIGN PATENT DOCUMENTS

| CA | 2689423 | 12/2015 |
| CN | 102123274 | 3/2013 |

(Continued)

OTHER PUBLICATIONS http://www.nbcnews.com/storyline/egyptair-crash/some-airlines-stream-black-box-data-cost-keeps-others-offline-n580966?cid=eml_onsite.

*Primary Examiner* — Richard M Camby
(74) *Attorney, Agent, or Firm* — Mercedes V. O'Connor; Rockman Videbeck & O'Connor

(57) ABSTRACT

A data acquisition and recording system (DARS) and viewer for mobile assets that includes a data encoder, onboard data manager, and at least one local memory module. DARS processes video data from at least one 360 degree camera and stores a compressed record of the data at least once per second in the local memory module. DARS is designed to run in near real-time mode, storing a full record comprising five minutes of data to a remote memory module every five minutes, and in real-time mode, streaming video data to the remote memory module by uploading a record of data at least once per second and up to once every tenth of a second. Remotely located users can view video, audio, and data in various view modes through a web browser or virtual reality device, which provides for quicker emergency response, validate the effectiveness of repairs and rerouting, and monitor crew performance and safety.

7 Claims, 6 Drawing Sheets

Related U.S. Application Data continuation-in-part of application No. 15/907,486, filed on Feb. 28, 2018, now Pat. No. 10,445,951, which is a continuation of application No. 15/595,650, filed on May 15, 2017, now Pat. No. 9,934,623.

(60) Provisional application No. 62/337,225, filed on May 16, 2016, provisional application No. 62/337,227, filed on May 16, 2016, provisional application No. 62/337,228, filed on May 16, 2016.

(51) Int. Cl.
  *H04N 5/247* (2006.01)
  *H04N 5/77* (2006.01)
  *H04N 5/92* (2006.01)
  H04N 9/804 (2006.01)
  G07C 5/00 (2006.01)

(52) U.S. Cl.
  CPC .............. *H04N 5/247* (2013.01); *H04N 5/77* (2013.01); *H04N 5/9201* (2013.01); *G07C 5/008* (2013.01); *H04N 9/8042* (2013.01)

(56) References Cited

U.S. PATENT DOCUMENTS

| | | | |
|---|---|---|---|
| 5,440,336 A | 8/1995 | Buhro et al. | |
| 5,455,684 A | 10/1995 | Fujinami et al. | |
| 5,627,508 A | 5/1997 | Cooper et al. | |
| 5,638,299 A | 6/1997 | Miller | |
| 6,109,532 A | 8/2000 | Schindler et al. | |
| 6,263,268 B1 | 7/2001 | Nathanson | |
| 6,308,044 B1 | 10/2001 | Wright et al. | |
| 6,392,692 B1 | 5/2002 | Monroe | |
| 6,496,777 B2 | 12/2002 | Tennison et al. | |
| 6,659,861 B1 | 12/2003 | Faris et al. | |
| 6,892,167 B2 | 5/2005 | Polan et al. | |
| 6,915,190 B2 | 7/2005 | Galasso | |
| 7,003,289 B1* | 2/2006 | Kolls ............... | G07C 5/008 455/422.1 |
| 7,302,323 B2 | 11/2007 | Anderson et al. | |
| 7,440,848 B2 | 10/2008 | Anderson | |
| 7,640,083 B2 | 12/2009 | Monroe | |
| 7,755,479 B2 | 7/2010 | Webb, Sr. | |
| 7,756,617 B1 | 7/2010 | Cluff et al. | |
| 7,761,544 B2 | 7/2010 | Manasseh et al. | |
| 7,782,365 B2* | 8/2010 | Levien ............. | H04N 1/2112 348/220.1 |
| 7,924,153 B1 | 4/2011 | Furey et al. | |
| 7,953,425 B2 | 5/2011 | Jordan | |
| 8,081,214 B2 | 12/2011 | Vanman et al. | |
| 8,584,184 B2* | 11/2013 | Thomas ............. | G06F 3/0481 725/91 |
| 8,589,994 B2 | 11/2013 | Monroe | |
| 8,612,170 B2 | 12/2013 | Smith et al. | |
| 8,625,878 B2 | 1/2014 | Haas et al. | |
| 8,768,534 B2 | 7/2014 | Lentz | |
| 8,798,148 B2 | 8/2014 | Kostrzewski et al. | |
| 8,942,426 B2 | 1/2015 | Bar-Am | |
| 8,979,363 B2 | 3/2015 | Groeneweg et al. | |
| 9,003,052 B2 | 4/2015 | Holstein | |
| 9,031,791 B2 | 5/2015 | Nedilko et al. | |
| 9,049,433 B1 | 6/2015 | Prince | |
| 9,050,984 B2 | 6/2015 | Li et al. | |
| 9,191,053 B2 | 11/2015 | Ziarno et al. | |
| 9,235,765 B2 | 1/2016 | Bentley et al. | |
| 9,260,122 B2 | 2/2016 | Haas et al. | |
| 9,260,199 B2 | 2/2016 | Sundararajan et al. | |
| 9,285,294 B2 | 3/2016 | Jordan et al. | |
| 9,285,295 B2 | 3/2016 | Jordan et al. | |
| 9,313,276 B2 | 4/2016 | Pereira | |
| 9,346,476 B2 | 5/2016 | Dargy et al. | |
| 9,500,545 B2 | 11/2016 | Smith et al. | |
| 10,242,714 B2* | 3/2019 | Roy ............... | H04N 21/440218 |
| 2003/0152145 A1 | 8/2003 | Kawakita | |
| 2004/0027255 A1 | 2/2004 | Greenbaum | |
| 2004/0039504 A1 | 2/2004 | Coffee et al. | |
| 2004/0260777 A1 | 12/2004 | Kolb et al. | |
| 2005/0240343 A1 | 10/2005 | Schmidt et al. | |
| 2005/0288903 A1 | 12/2005 | Jackson et al. | |
| 2006/0276943 A1 | 12/2006 | Anderson et al. | |
| 2007/0076312 A1 | 4/2007 | Jordan | |
| 2008/0176583 A1 | 7/2008 | Brachet et al. | |
| 2009/0102638 A1 | 4/2009 | Olsen et al. | |
| 2010/0023201 A1 | 1/2010 | Kinney et al. | |
| 2011/0077819 A1 | 3/2011 | Sakaguchi et al. | |
| 2013/0274954 A1 | 10/2013 | Jordan, Jr. et al. | |
| 2013/0307693 A1 | 11/2013 | Stone et al. | |
| 2014/0052315 A1 | 2/2014 | Isailovski et al. | |
| 2014/0192151 A1* | 7/2014 | Wang ............... | H04N 19/70 348/43 |
| 2014/0285337 A1 | 9/2014 | Gebhardt | |
| 2014/0347481 A1 | 11/2014 | Kostrzewski et al. | |
| 2015/0009331 A1 | 1/2015 | Venkatraman | |
| 2015/0094885 A1 | 4/2015 | Dargy et al. | |
| 2015/0149118 A1 | 5/2015 | Jordan et al. | |
| 2015/0185090 A1 | 7/2015 | Groeneweg et al. | |
| 2015/0221141 A1 | 8/2015 | Negritto | |
| 2015/0225002 A1 | 8/2015 | Branka et al. | |
| 2015/0339863 A1 | 11/2015 | Allwardt et al. | |
| 2015/0363981 A1 | 12/2015 | Ziarno et al. | |
| 2016/0046308 A1 | 2/2016 | Chung et al. | |
| 2016/0073025 A1 | 3/2016 | Cilia | |
| 2016/0073346 A1 | 3/2016 | Nicks et al. | |
| 2016/0075443 A1 | 3/2016 | Schmutz et al. | |
| 2016/0131483 A1 | 5/2016 | Jordan et al. | |
| 2020/0294401 A1* | 9/2020 | Kerecsen ............ | G05D 1/0287 |
| 2020/0349345 A1* | 11/2020 | Hodge ............... | G06Q 30/08 |

FOREIGN PATENT DOCUMENTS

| | | |
|---|---|---|
| KR | 20150096203 | 8/2015 |
| RU | 2573272 | 1/2020 |
| WO | 2004019601 | 6/2004 |
| WO | 2006128124 | 11/2006 |
| WO | 2015150369 | 10/2015 |

\* cited by examiner

REAL-TIME DATA ACQUISITION AND RECORDING SYSTEM VIEWER

CROSS-REFERENCE TO RELATED APPLICATION(S)

This application claims priority to U.S. Provisional Application No. 62/337,225, filed May 16, 2016, claims priority to U.S. Provisional Application No. 62/337,227, filed May 16, 2016, claims priority to U.S. Provisional Application No. 62/337,228, filed May 16, 2016, claims priority to and is a continuation-in-part of U.S. Non-provisional application Ser. No. 15/595,650, filed May 15, 2017, now U.S. Pat. No. 9,934,623, issued Apr. 3, 2018, claims priority to and is a continuation-in-part of U.S. Non-provisional application Ser. No. 15/907,486, filed Feb. 28, 2018, and claims priority to and is a divisional of U.S. Non-provisional application Ser. No. 15/595,689, filed May 15, 2017, to the extent allowed by law and the contents of which are incorporated herein by reference in the entireties.

TECHNICAL FIELD

This disclosure relates to a system and method for viewing video, images, and data from a real-time data acquisition and recording system used in high value mobile assets.

BACKGROUND

High value mobile assets such as locomotives, aircraft, mass transit systems, mining equipment, transportable medical equipment, cargo, marine vessels, and military vessels typically employ onboard data acquisition and recording "black box" systems and/or "event recorder" systems. These data acquisition and recording systems, such as event data recorders or flight data recorders, log a variety of system parameters used for incident investigation, crew performance evaluation, fuel efficiency analysis, maintenance planning, and predictive diagnostics. A typical data acquisition and recording system comprises digital and analog inputs, as well as pressure switches and pressure transducers, which record data from various onboard sensor devices. Recorded data may include such parameters as speed, distance traveled, location, fuel level, engine revolution per minute (RPM), fluid levels, operator controls, pressures, current and forecasted weather conditions and ambient conditions. In addition to the basic event and operational data, video and audio event/data recording capabilities are also deployed on many of these same mobile assets. Typically, data is extracted from data recorders, after an incident has occurred involving an asset and investigation is required, once the data recorder has been recovered. Certain situations may arise where the data recorder cannot be recovered or the data is otherwise unavailable. In these situations, the data, such as event and operational data, video data, and audio data, acquired by the data acquisition and recording system is needed promptly regardless of whether physical access to the data acquisition and recording system or the data is available.

SUMMARY

This disclosure relates generally to real-time data acquisition and recording systems used in high value mobile assets. The teachings herein can provide real-time, or near real-time, access to data, such as event and operational data, video data, and audio data, recorded by a real-time data acquisition and recording system on a high value mobile asset. One implementation of a method for processing, storing, and transmitting data from at least one mobile asset described herein includes receiving, using a multimedia management system onboard the mobile asset, data based on at least one data signal from at least one of: at least one 360 degree camera; at least one fixed camera; and at least one microphone; receiving, using a data recorder onboard the mobile asset, the data; encoding, using a data encoder of the data recorder, a record comprising a bit stream based on the data; and storing, using an onboard data manager of the data recorder, at least one of the data and the record at a configurable first predetermined rate in at least one local memory component of the data recorder.

One implementation of a method for displaying data from at least one mobile asset described herein includes receiving, using a web server, a request comprising specified multimedia data of the at least one mobile asset and a specified view mode; receiving, using the web server, the specified multimedia data of the at least one mobile asset from a remote memory component; and displaying, using a display device, the specified multimedia data of the at least one mobile asset in the specified view.

One implementation of a real-time data acquisition and recording system described herein includes at least one of at least one 360 degree camera, at least one fixed camera, and at least one microphone; a multimedia management system onboard the mobile asset configured to receive data based on at least one data signal from the at least one of the at least one 360 degree camera, at least one fixed camera, and at least one microphone; a data recorder onboard the mobile asset comprising at least one local memory component, an onboard data manager, and a data encoder, the data recorder configured to receive the data from the multimedia management system; the data encoder configured to encode a record comprising a bit stream based on the data; and the onboard data manager configured to store at least one of the data and the record at a configurable first predetermined rate in the at least one local memory component.

Variations in these and other aspects of the disclosure will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
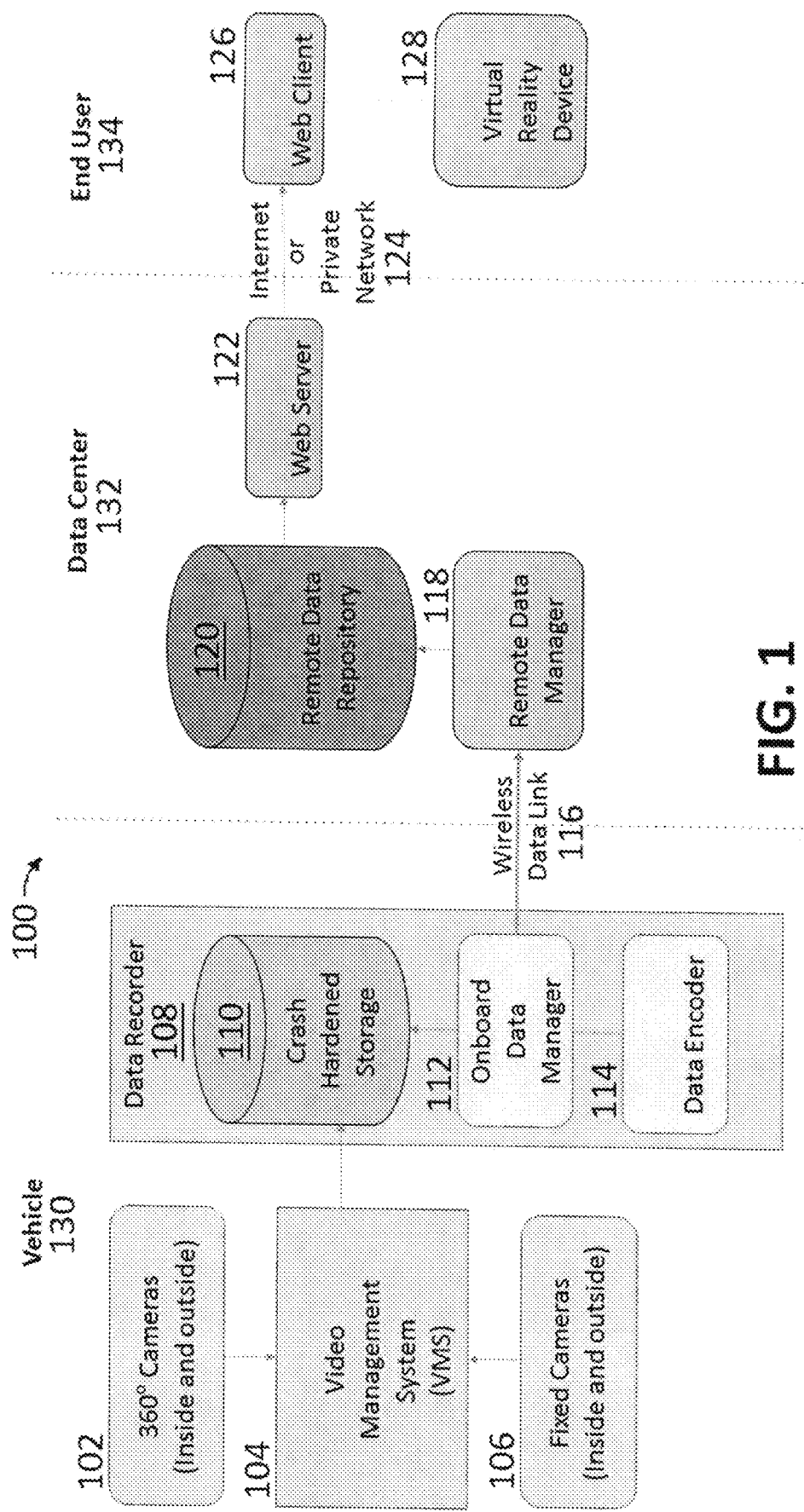
FIG. 1 illustrates a field implementation of an exemplary real-time data acquisition and recording system in accordance with implementations of this disclosure.

A real-time data acquisition and recording system described herein provides real-time, or near real-time, access to a wide range of data, such as event and operational data, video data, and audio data, of a high value asset to remotely located users such as asset owners, operators and investigators. The data acquisition and recording system records data, via a data recorder, relating to the asset and streams the data to a remote data repository and remotely located users prior to, during, and after an incident has occurred. The data is streamed to the remote data repository in real-time, or near real-time, making information available at least up to the time of an incident or emergency situation, thereby virtually eliminating the need to locate and download the "black box" in order to investigate an incident involving the asset and eliminating the need to interact with the data recorder on the asset to request a download of specific data, to locate and transfer files, and to use a custom application to view the data. The system of the present disclosure retains typical recording capabilities and adds the ability to stream data to a remote data repository and remote end user prior to, during, and after an incident. In the vast majority of situations, the information recorded in the data recorder is redundant and not required as data has already been acquired and stored in the remote data repository.

Prior to the system of the present disclosure, data was extracted from the "black box" or "event recorder" after an incident had occurred and an investigation was required. Data files containing time segments recorded by the "black box" had to be downloaded and retrieved from the "black box" and then viewed by a user with proprietary software. The user would have to obtain physical or remote access to the asset, select the desired data to be downloaded from the "black box," download the file containing the desired information to a computing device, and locate the appropriate file with the desired data using a custom application that operates on the computing device. The system of the present disclosure has eliminated the need for the user to perform these steps, only requiring the user to use a common web browser to navigate to the desired data. The remotely located user may access a common web browser to navigate to desired data relating to a selected asset to view and analyze the operational efficiency and safety of assets in real-time or near real-time.

The remotely located user, such as an asset owner, operator, and/or investigator, may access a common web browser to navigate to live and/or historic desired data relating to a selected asset to view and analyze the operational efficiency and safety of assets in real-time or near real-time. The ability to view operations in real-time, or near real-time, enables rapid evaluation and adjustment of behavior. During an incident, for example, real-time information and/or data can facilitate triaging the situation and provide valuable information to first responders. During normal operation, for example, real-time information and/or data can be used to audit crew performance and to aid network wide situational awareness.

The system of the present disclosure uses 360 degree cameras in, on, or in the vicinity of a mobile asset as part of a data acquisition and recording system. Prior to the system of the present disclosure, "black box" and/or "event recorders" did not include 360 degrees cameras in, on, or in the vicinity of the mobile asset. The system of the present disclosure adds the ability to use and record videos using 360 degree cameras as part of the data acquisition and recording system, providing 360 degree views in, on, or in the vicinity of the mobile asset to a remote data repository and a remote user and investigators prior to, during, and after an incident involving the mobile asset has occurred. The ability to view operations and/or 360 degree video in real-time, or near real-time, enables rapid evaluation and adjustment of crew behavior. Owners, operators, and investigators can view and analyze the operational efficiency, safety of people, vehicles, and infrastructures and can investigate or inspect an incident. The ability to view 360 degree video from the mobile asset enables rapid evaluation and adjustment of crew behavior. During an incident, for example, 360 degree video can facilitate triaging the situation and provide valuable information to first responders and investigators. During normal operation, for example, 360 degree video can be used to audit crew performance and to aid network wide situational awareness. The 360 degree cameras and fixed cameras provide a complete picture for situations to provide surveillance video for law enforcement and/or rail police, inspection of critical infrastructure, monitoring of railroad crossings, view track work progress, crew auditing both inside the cab and in the yard, and real-time remote surveillance.

Prior systems required users to download video files containing time segments in order to view the video files using a proprietary software application or other external video playback applications. The data acquisition and recording system of the present disclosure provides 360 degree video and image information and audio information that can be displayed to a remote user through the use of a virtual reality device and/or through a standard web client, thereby eliminating the need to download and use external applications to watch the videos. Additionally, remotely located users can view 360 degree videos in various modes through the use of a virtual reality device or through a standard web client, such as a web browser, thereby eliminating the need to download and use external applications to watch the video. Prior video systems required the user to download video files containing time segments of data that were only viewable using proprietary application software or other external video playback applications which the user had to purchase separately.

Data may include, but is not limited to, video and image information from cameras located at various locations in, on or in the vicinity of the asset and audio information from microphones located at various locations in, on or in vicinity of the asset. A 360 degree camera is a camera that provides a 360 degree spherical field of view and/or a 360 degree hemispherical field of view. Using 360 degree cameras in, on or in the vicinity of an asset provides the ability to use and record video using the 360 degree cameras as part of DARS, thereby making the 360 degree view in, on or in the vicinity of the asset available to a remote data repository, remotely located users, and investigators prior to, during and after an incident.

FIG. 1 illustrates a field implementation of a first embodiment of an exemplary real-time data acquisition and recording system (DARS) 100 in which aspects of the disclosure can be implemented. DARS 100 is a system that delivers real time information, video information, and audio information from a data recorder 108 on a mobile asset 130 to remotely located end users via a data center 132. The data recorder 108 is installed on the vehicle or mobile asset 130 and communicates with any number of various information sources through any combination of wired and/or wireless data links such as a wireless gateway/router (not shown). The data recorder 108 comprises a crash hardened memory module 110, an onboard data manager 112, and a data encoder 114. In a second embodiment, the data recorder 108 can also include a non-crash hardened removable storage device (not shown). An exemplary hardened memory module 110 can be, for example, a crashworthy event recorder memory module that complies with the Code of Federal Regulations and the Federal Railroad Administration regulations, a crash survivable memory unit that complies with the Code of Federal Regulations and the Federal Aviation Administration regulations, a crash hardened memory module in compliance with any applicable Code of Federal Regulations, or any other suitable hardened memory device as is known in the art. The wired and/or wireless data links can include any one of or combination of discrete signal inputs, standard or proprietary Ethernet, serial connections, and wireless connections.

Data recorder 108 gathers video data, audio data, and other data and/or information from a wide variety of sources, which can vary based on the asset's configuration, through onboard data links. In this implementation, data recorder 108 receives data from a video management system 104 that continuously records video data and audio data from 360 degree cameras 102 and fixed cameras 106 that are placed in, on or in the vicinity of the asset 130 and the video management system 104 stores the video and audio data to the crash hardened memory module 110, and can also store the video and audio data in the non-crash hardened removable storage device of the second embodiment. Different versions of the video data are created using different bitrates or spatial resolutions and these versions are separated into segments of variable length, such as thumbnails, five minute low resolution segments, and five minute high resolution segments.

The data encoder 114 encodes at least a minimum set of data that is typically defined by a regulatory agency. The data encoder 114 receives video and audio data from the video management system 104 and compresses or encodes the data and time synchronizes the data in order to facilitate efficient real-time transmission and replication to a remote data repository 120. The data encoder 114 transmits the encoded data to the onboard data manager 112 which then sends the encoded video and audio data to the remote data repository 120 via a remote data manager 118 located in the data center 130 in response to an on-demand request by a remotely located user 134 or in response to certain operating conditions being observed onboard the asset 130. The onboard data manager 112 and the remote data manager 118 work in unison to manage the data replication process. The remote data manager 118 in the data center 132 can manage the replication of data from a plurality of assets. The video and audio data stored in the remote data repository 120 is available to a web server 122 for the remote located user 134 to access.

The onboard data manager 112 also sends data to a queueing repository (not shown). The onboard data manager 112 monitors the video and audio data stored in the crash hardened memory module 110, and the optional non-crash hardened removable storage device of the second embodiment, by the video management system 104 and determines whether it is in near real-time mode or real-time mode. In near real-time mode, the onboard data manager 112 stores the encoded data, including video data, audio data, and any other data or information, received from the data encoder 114 and any event information in the crash hardened memory module 110, and the optional non-crash hardened removable storage device of the second embodiment, and in the queueing repository. After five minutes of encoded data has accumulated in the queueing repository, the onboard data manager 112 stores the five minutes of encoded data to the remote data repository 120 via the remote data manager 118 in the data center 132 through a wireless data link 116. In real-time mode, the onboard data manager 112 stores the encoded data, including video data, audio data, and any other data or information, received from the data encoder 114 and any event information to the remote data repository 120 via the remote data manager 118 in the data center 132 through the wireless data link 116. The onboard data manager 112 and the remote data manager 118 can communicate over a variety of wireless communications links. Wireless data link 116 can be, for example, a wireless local area network (WLAN), wireless metropolitan area network (WMAN), wireless wide area network (WWAN), a private wireless system, a cellular telephone network or any other means of transferring data from the data recorder 108 to, in this example, the remote data manager 118. The process of sending and retrieving video data and audio data remotely from the asset 130 requires a wireless data connection between the asset 130 and the data center 132. When a wireless data connection is not available, the data is stored and queued in the crash hardened memory module 110, and the optional non-crash hardened removable storage device of the second embodiment, until wireless connectivity is restored. The video, audio, and any other additional data retrieval process resumes as soon as wireless connectivity is restored.

In parallel with data recording, the data recorder 108 continuously and autonomously replicates data to the remote data repository 120. The replication process has two modes, a real-time mode and a near real-time mode. In real-time mode, the data is replicated to the remote data repository 120 every second. In near real-time mode, the data is replicated to the remote data repository 120 every five minutes. The rate used for near real-time mode is configurable and the rate used for real-time mode can be adjusted to support high resolution data by replicating data to the remote data repository 120 every 0.10 seconds. Near real-time mode is used during normal operation, under most conditions, in order to improve the efficiency of the data replication process.

Real-time mode can be initiated based on events occurring onboard the asset 130 or by a request initiated from the data center 132. A typical data center 132 initiated request for real-time mode is initiated when the remotely located user 134 has requested real-time information from a web client 126. A typical reason for real-time mode to originate onboard the asset 130 is the detection of an event or incident such as an operator initiating an emergency stop request, emergency braking activity, rapid acceleration or deceleration in any axis, or loss of input power to the data recorder 108. When transitioning from near real-time mode to real-time mode, all data not yet replicated to the remote data repository 120 is replicated and stored in the remote data repository 120 and then live replication is initiated. The transition between near real-time mode and real-time mode typically occurs in less than five seconds. After a predetermined amount of time has passed since the event or incident, a predetermined amount of time of inactivity, or when the user 134 no longer desires real-time information from the asset 130, the data recorder 108 reverts to near real-time mode. The predetermined amount of time required to initiate the transition is configurable and is typically set to ten minutes.

When the data recorder 108 is in real-time mode, the onboard data manager 112 attempts to continuously empty its queue to the remote data manager 118, storing the data to the crash hardened memory module 110, and the optional non-crash hardened removable storage device of the second embodiment, and sending the data to the remote data manager 118 simultaneously.

Upon receiving video data, audio data, and any other data or information to be replicated from the data recorder 108, the remote data manager 118 stores the data to the remote data repository 120 in the data center 130. The remote data repository 120 can be, for example, cloud-based data storage or any other suitable remote data storage. When data is received, a process is initiated that causes a data decoder (not shown) to decode the recently replicated data from the remote data repository 120 and send the decoded data to a remote event detector (not shown). The remote data manager 118 stores vehicle event information in the remote data repository 120. When the remote event detector receives the decoded data, it processes the decoded data to determine if an event of interest is found in the decoded data. The decoded information is then used by the remote event detector to detect events, incidents, or other predefined situations, in the data occurring with the asset 130. Upon detecting an event of interest from the decoded data previously stored in the remote data repository 120, the remote event detector stores the event information and supporting data in the remote data repository 120.

Video data, audio data, and any other data or information is available to the user 134 in response to an on-demand request by the user 134 and/or is sent by the onboard data manager 112 to the remote data repository 120 in response to certain operating conditions being observed onboard the asset 130. Video data, audio data, and any other data or information stores in the remote data repository 120 is available on the web server 122 for the user 134 to access. The remotely located user 134 can access the video data, audio data, and any other data or information relating to the specific asset 130, or a plurality of assets, stored in the remote data repository 120 using the standard web client 126, such as a web browser, or a virtual reality device 128 which, in this implementation, can display thumbnail images of selected cameras. The web client 126 communicates the user's 134 request for video, audio, and/or other information to the web server 122 through a network 124 using common web standards protocols, and techniques. Network 124 can be, for example, the Internet. Network 124 can also be a local area network (LAN), metropolitan area network (MAN), wide area network (WAN), virtual private network (VPN), a cellular telephone network or any other means of transferring data from the web server 122 to, in this example, the web client 126. The web server 122 requests the desired data from the remote data repository 120. The web server 122 then sends the requested data to the web client 126 that provides playback and real-time display of standard video and 360 degree video. The web client 126 plays the video data, audio data, and any other data or information for the user 134 who can interact with the 360 degree video data for viewing and analysis. The user 134 can also download the video data, audio data, and any other data or information using the web client 126 and can then use the virtual reality device 128 to interact with the 360 degree video data for viewing and analysis.

Figure 4:
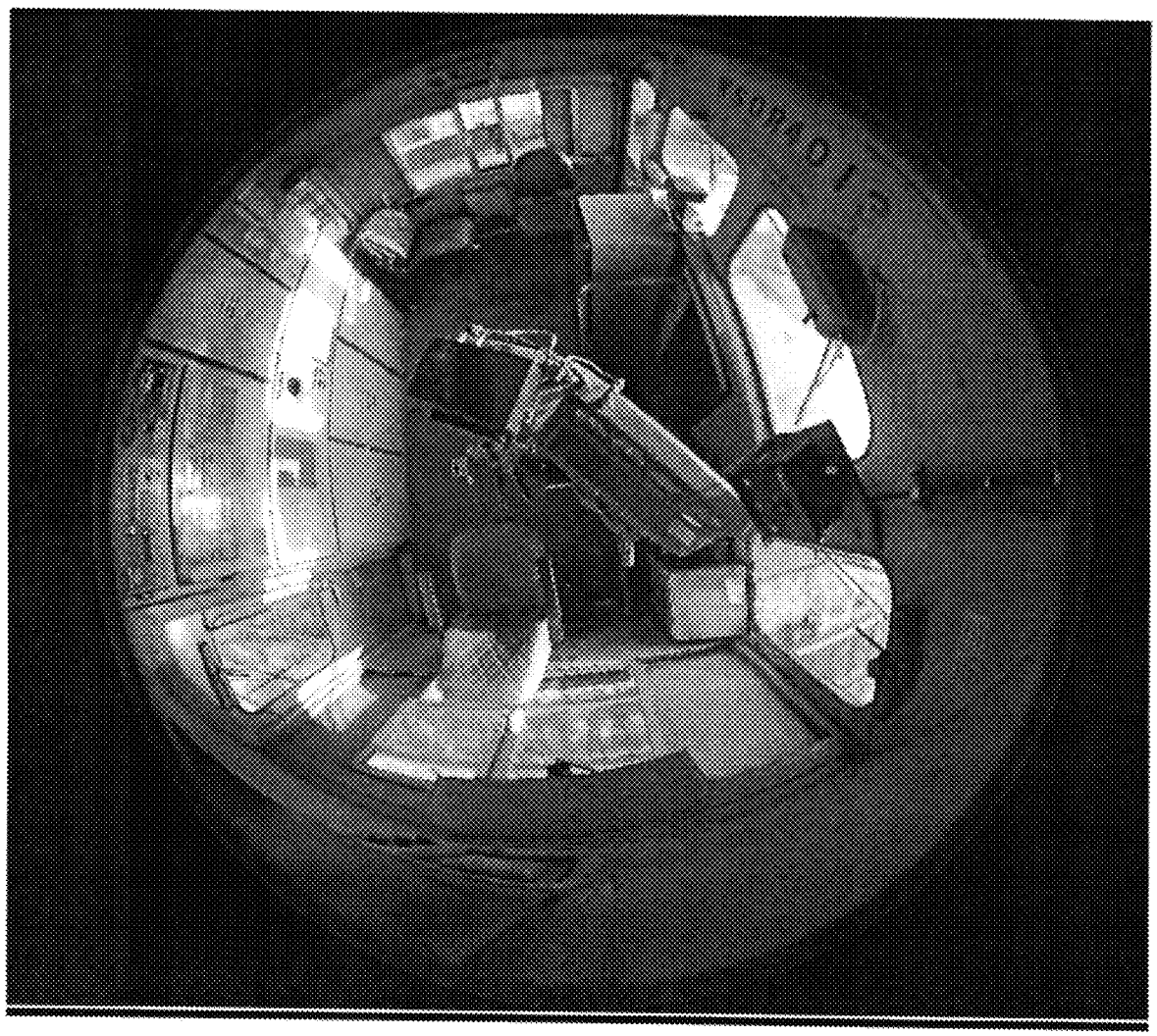
FIG. 4 is a diagram that illustrates an exemplary fisheye view of a 360 degree camera of the real-time data acquisition and recording system in accordance with implementations of this disclosure.
Figure 5:
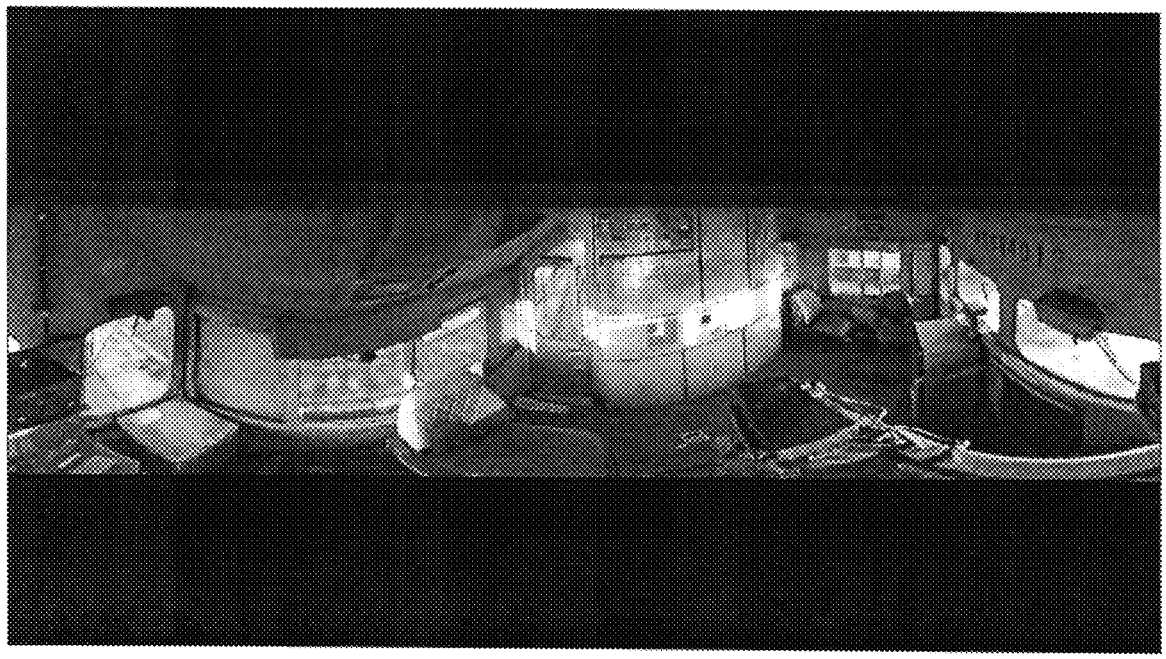
FIG. 5 is a diagram that illustrates an exemplary panorama view of the 360 degree camera of the real-time data acquisition and recording system in accordance with implementations of this disclosure.
Figure 6:
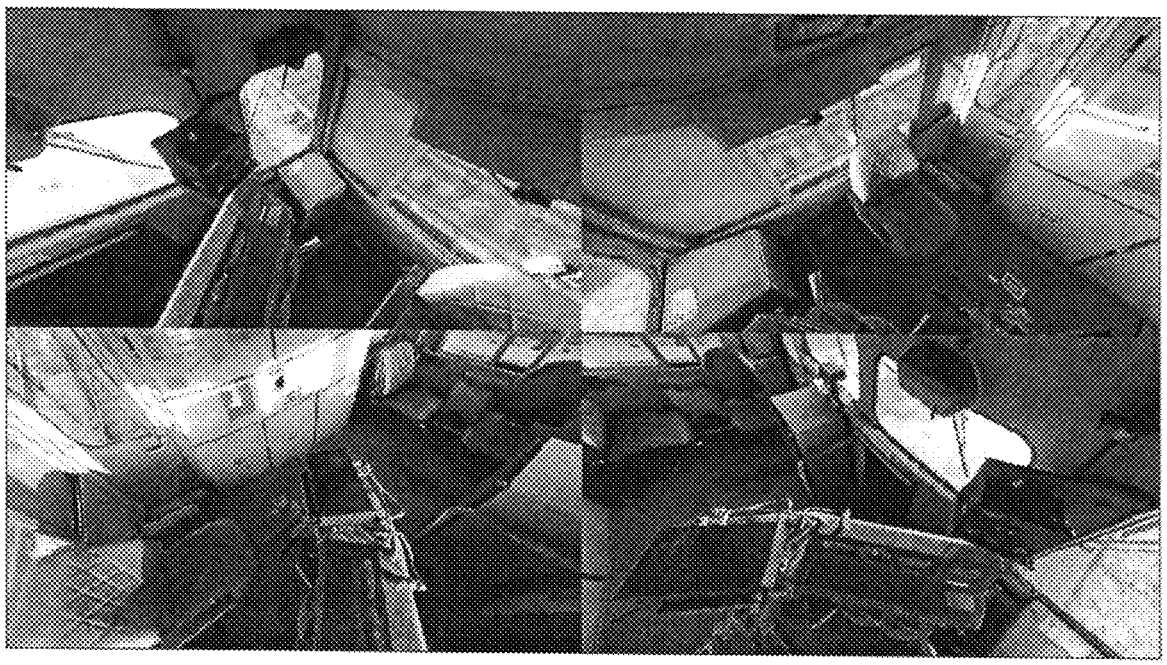
FIG. 6 is a diagram that illustrates an exemplary quad view of the 360 degree camera of the real-time data acquisition and recording system in accordance with implementations of this disclosure.
Figure 7:
FIG. 7 is a diagram that illustrates an exemplary dewarped view of the 360 degree camera of the real-time data acquisition and recording system in accordance with implementations of this disclosure.

The web client 126 can be enhanced with a software application that provides the playback of 360 degree video in a variety of different modes. The user 134 can elect the mode in which the software application presents the video playback such as, for example, fisheye view as shown in FIG. 4, panorama view as shown in FIG. 5, double panorama view (not shown), quad view as shown in FIG. 6, and dewarped view as shown in FIG. 7.

Figure 2:
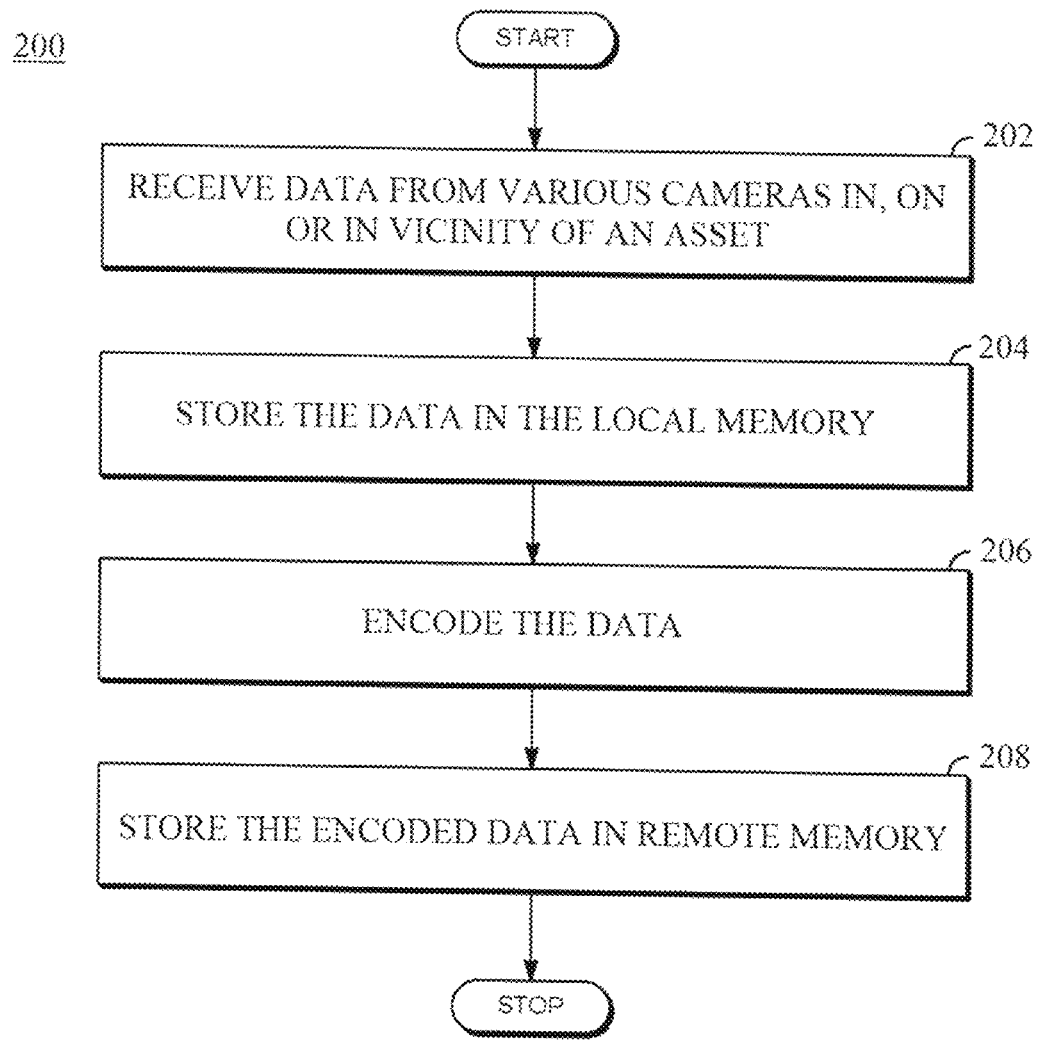
FIG. 2 is a flow diagram of a process for recording video data, audio data, and/or information from a mobile asset in accordance with implementations of this disclosure.

FIG. 2 is a flow diagram showing a process 200 for recording video data, audio data, and/or information from the asset 130 in accordance with an implementation of this disclosure. Video management system 104 receives data signals from various input components 202, such as the 360 degree cameras 102 and the fixed cameras 106 on, in or in the vicinity of the asset 130. The video management system 104 then stores the video data, audio data, and/or information in the crash hardened memory module 110, and the optional non-crash hardened removable storage device of the second embodiment, 204 using any combination of industry standard formats, such as, for example, still images, thumbnails, still image sequences, or compressed video formats. Data encoder 114 creates a record that includes a structured series of bits used to configure and record the data signal information 206. In near real-time mode, the video management system 104 stores video data into the crash hardened memory module 110, and the optional non-crash hardened removable storage device of the second embodiment, while only sending limited video data, such as thumbnails or very short low resolution video segments, off board to the remote data repository 120 208.

In another implementation, the encoded record is then sent to the onboard data manager 112 that sequentially combines a series of records in chronological order into record blocks that include up to five minutes of data. An interim record block includes less than five minutes of data while a full record block includes a full five minutes of data. Each record block includes all the data required to fully decode the included signals, including a data integrity check. At a minimum, a record block must start with a start record and end with an end record.

In order to ensure that all of the encoded signal data is saved to the crash hardened memory module 110, and the optional non-crash hardened removable storage device of the second embodiment, should the data recorder 108 lose power, the onboard data manager 112 stores interim record blocks in the crash hardened memory module 110, and the optional non-crash hardened removable storage device of the second embodiment, at a predetermined rate, where the predetermined rate is configurable and/or variable. Interim record blocks are saved at least once per second but can also be saved as frequently as once every tenth of a second. The rate at which interim record blocks are saved depends on the sampling rates of each signal. Every interim record block includes the full set of records since the last full record block. The data recorder 108 can alternate between two temporary storage locations in the crash hardened memory module 110 when recording each interim record block to prevent the corruption or loss of more than one second of data when the data recorder 108 loses power while storing data to the crash hardened memory module 110. Each time a new interim record block is saved to a temporary crash hardened memory location it will overwrite the existing previously stored interim record block in that location.

Every five minutes, in this implementation, when the data recorder 108 is in near real-time mode, the onboard data manager 112 stores a full record block including the last five minutes of encoded signal data into a record segment in the crash hardened memory module 110, and the optional non-crash hardened removable storage device of the second embodiment, and sends a copy of the full record block, comprising five minutes of video data, audio data, and/or information, to the remote data manager 118 to be stored in the remote data repository 120 for a predetermined retention period such as two years. The crash hardened memory module 110, and the optional non-crash hardened removable storage device of the second embodiment, stores a record segment of the most recent record blocks for a mandated storage duration, which in this implementation is the federally mandated duration that the data recorder 108 must store operational or video data in the crash hardened memory module 110 with an additional 24 hour buffer, and is then overwritten.

Figure 3:
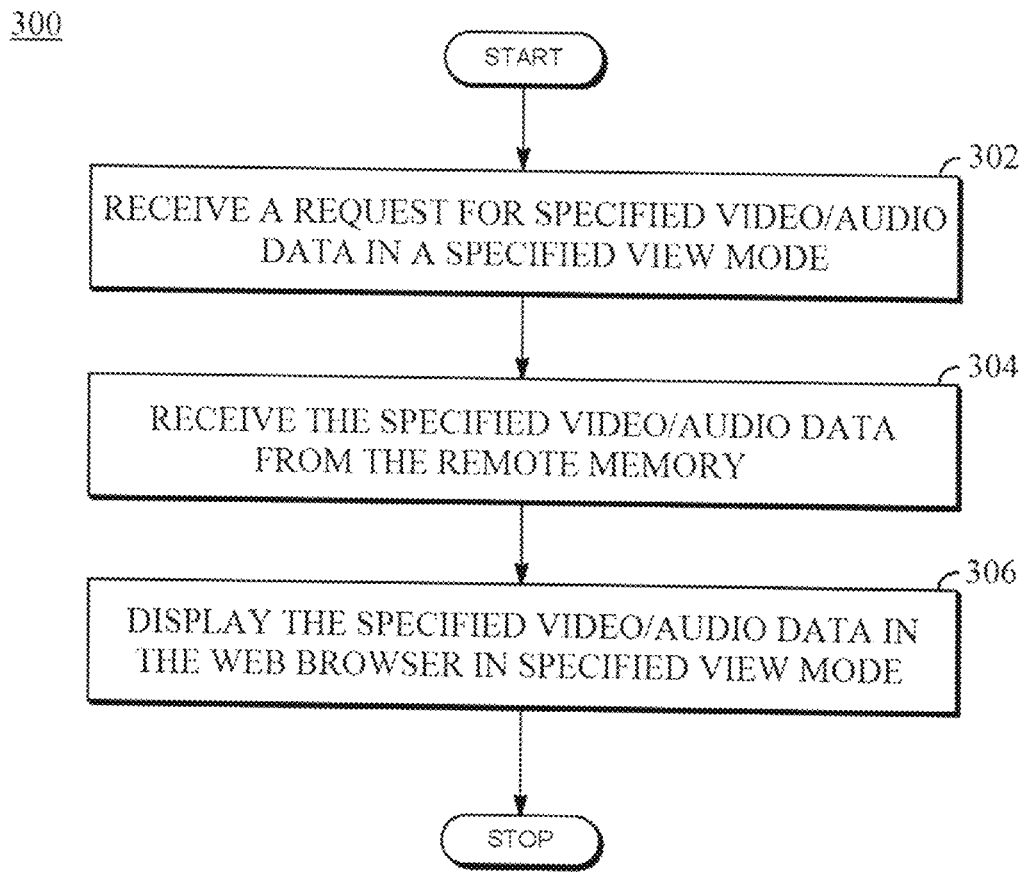
FIG. 3 is a flow diagram of a process for displaying recorded video data, audio data, and/or information from the mobile asset in accordance with implementations of this disclosure.

FIG. 3 is a flow diagram showing a process 300 for viewing data and/or information from the asset 130 through a web browser or virtual reality device. When an event occurs or when the remotely located authorized user 134 requests a segment of video data stored in the crash hardened memory module 110 via the web client 126, the onboard data manager 112, depending on the event, will begin sending video data off board in real-time at the best resolution available given the bandwidth of the wireless data link 116. The remotely located user 134 initiates a request for specific video and/or audio data in a specific view mode 302 through the web client 126 which communicates the request to the web server 122 through network 124. The web server 122 requests the specific video and/or audio data from the remote data repository 120 and sends the requested video and/or audio data to the web client 126 304 through the network 124. The web client 126 displays the video and/or audio data in the view mode specified by the user 134 306. The user 134 can then download the specific video and/or audio data to view on the virtual reality device 128. In another implementation, in real-time mode thumbnails are sent first at one second intervals, then short segments of lower resolution videos, and then short segments of higher resolution videos.

For simplicity of explanation, process 200 and process 300 are depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

While the present disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed:

1. A method for displaying data to a remotely located user from at least one mobile asset comprising:
   receiving, using a web server, a request comprising specified multimedia data of the at least one mobile asset and a specified view mode;
   receiving, using the web server, the specified multimedia data of the at least one mobile asset from a remote memory component; and
   displaying, using a display device, the specified multimedia data of the at least one mobile asset in the specified view.

2. The method of claim 1, wherein the request is one of initiated by the remotely located user and initiated by an incident occurring with the at least one mobile asset.

3. The method of claim 2, wherein the incident is at least one of an operator of the mobile asset initiating an emergency stop request, emergency braking activity, rapid acceleration of the mobile asset in any axis, rapid deceleration of the mobile asset in any axis, and loss of input power to a data recorder onboard the mobile asset.

4. The method of claim 1, wherein the request is received by the web server via one of a wireless network connection and a wired network connection.

5. The method of claim 2, further comprising:
   receiving, using a web client, a command from the remotely located user for the request; and
   sending, using the web client, the command for the request to the web server.

6. The method of claim 1, wherein the display device is one of a web client and a virtual reality device.

7. The method of claim 1, wherein the specified view is one of fisheye view, dewarped view, panorama view, double panorama view, and quad view.

* * * * *